Aug. 14, 1945.　　F. G. DA ROZA ET AL　　2,382,611
INTERLOCKING SYSTEM
Filed June 3, 1943　　3 Sheets-Sheet 1
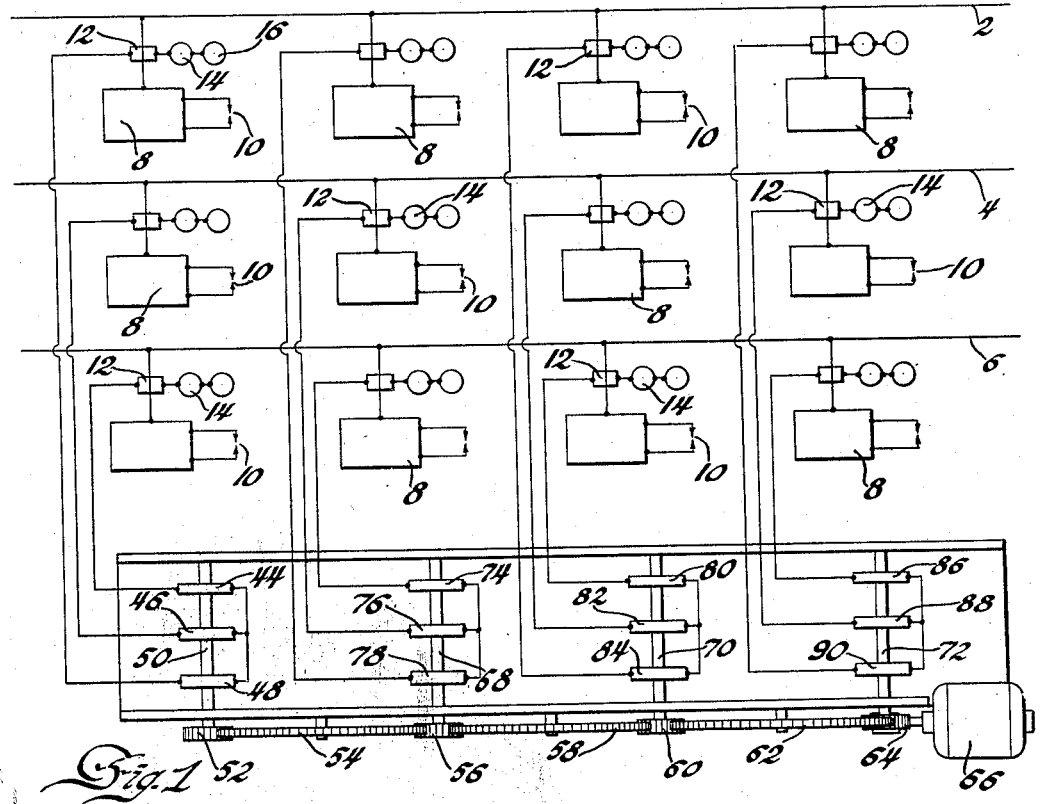
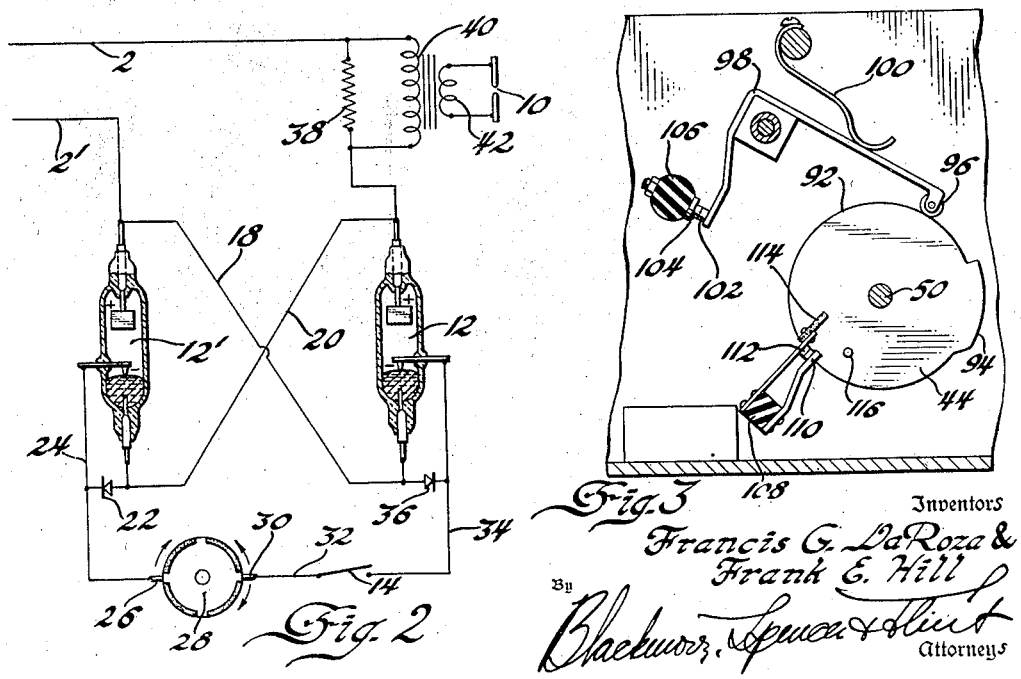
Inventors
Francis G. DaRoza &
Frank E. Hill
By
Blackmore, Spencer & Hunt
Attorneys Aug. 14, 1945.   F. G. DA ROZA ET AL   2,382,611
INTERLOCKING SYSTEM
Filed June 3, 1943   3 Sheets-Sheet 2

Inventors
Francis G. DaRoza &
Frank E. Hill
By
Blackmore, Smith & Flint
Attorneys

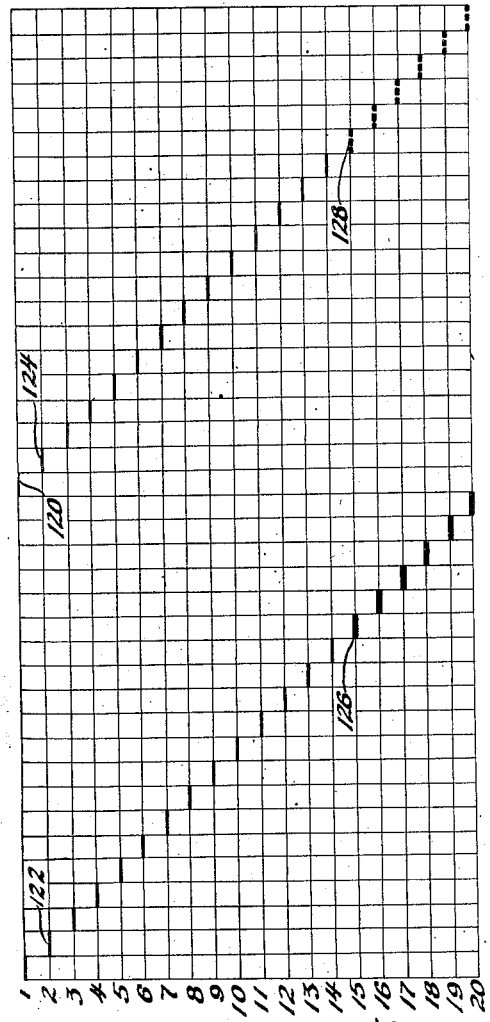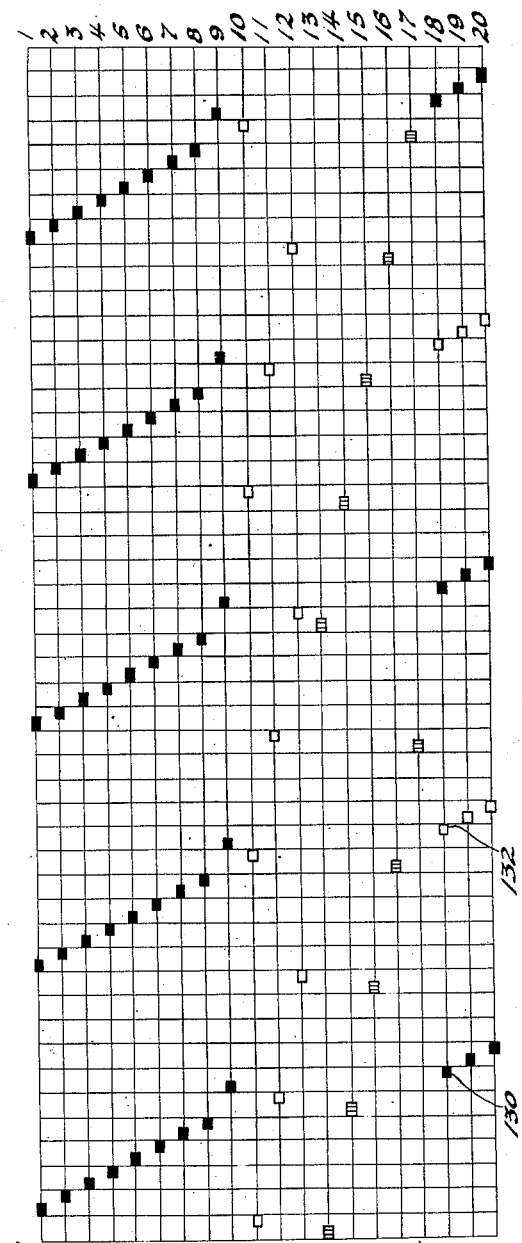

Patented Aug. 14, 1945

2,382,611

UNITED STATES PATENT OFFICE 2,382,611

INTERLOCKING SYSTEM

Francis G. da Roza, Ferndale, and Frank E. Hill, Detroit, Mich., assignors to General Motors Corporation, Detroit, Mich., a corporation of Delaware Application June 3, 1943, Serial No. 489,448

4 Claims. (Cl. 171—97)

This invention relates to control means and more particularly to means for controlling apparatus in which there are a plurality of intermittently operated units which are provided with power from the same power line or source. There are many commercial installations in which there are a plurality of units, such as motors, resistors, etc., located within a small area or plant which derive their power from a single incoming line or feeder and which are operated intermittently. These devices might be a series of presses in a metal shop, a series of drill presses in a machine shop, or other such devices, and each of these units may draw a considerable load from the supply line. In most instances the power available at the incoming terminals of the supply line would be ample to operate a single device, but if two or more devices are operated simultaneously from this source, then the amount of power available for each is curtailed and unsatisfactory operation may result. It is not practically feasible to provide a sufficiently large power supply at a plant to carry a large number of intermittently operated machines at one time. It is desirable to provide only that minimum amount of power necessary to operate a single or at best a few machines on a line as this is a much more economical installation.

A good example of installations in which this problem may arise would be in a plant operating a bank of welding machines, each of which consumes a relatively large amount of power when operated, but is not operated continuously, but rather intermittently. It is important in the operation of a welding machine to obtain uniform welds and in order to do this a uniform amount of power must be applied each time the machine is operated in order to give a uniform amount of heat per weld and thus uniform welds. If a welding machine is operated on a given supply line whereby the power input per welding cycle is substantially constant and the machine is regulated to give a satisfactory weld, that is, the length of time the current is on is adjusted, and then another machine is operated simultaneously from the same line, they will divide the power between them in some manner and in all probability neither will complete a satisfactory weld. If, therefore, some means could be provided to interlock the various machines provided with power from a single line so that only one could be energized at a time, then the power input to the plant would only have to be large enough to supply adequate power to a single unit and the installation would be economical.

It is therefore an object of our invention to provide means for intermittently operating a series of similar units from a given power source.

It is a further object of our invention to provide means for operating a plurality of units from a common power source in such a manner that no two will be operated simultaneously.

It is a still further object of our invention to provide a control system for a plurality of similar units to prevent more than one unit from operating at a time.

With these and other objects in view which will become apparent as the specification proceeds, the embodiments of our invention will be best understood by reference to the following specification and claims and the illustrations in the accompanying drawings, in which:

Figure 1 is a schematic diagram illustrating a system embodying our invention;

Figure 2 is a schematic wiring diagram showing a single welding unit;

Figure 3 is an enlarged vertical section showing one of the timer units operated by the cam shaft;

Figures 5 and 6 are operation charts showing the operating times of different machines interlocked by our system.

Figure 4:
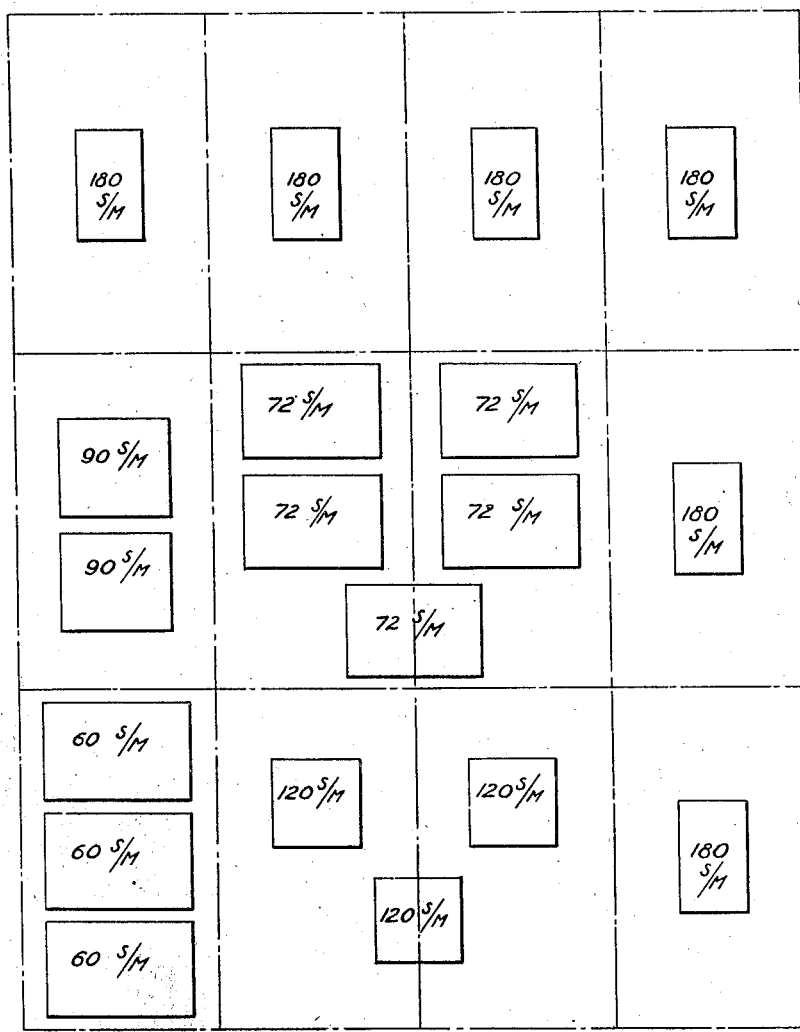
Figure 4 is a block diagram illustrating the principles of our invention.

Referring now more specifically to Figure 1, there is shown therein a three-phase power line 2, 4 and 6 to which it is desired to connect a series of welders in such a manner that no two will be applied to a single line at one time. The welding units are each illustrated by a welder 8 which has connected thereto the welding electrodes 10 and is controlled by ignitron tubes 12, a timer 14 and a phase shifter 16. Each is complete in itself and will perform welds of a desired character when energized.

Referring briefly to Figure 2, there is therein shown a complete welding control circuit in which two ignitron tubes 12 and 12' are shown connected in inverse relation to the power lines 2 and 2', 2' in this instance going to further control apparatus to be described, the anode of tube 12' being connected to the cathode of tube 12 through line 18 and the anode of tube 12 being connected to the cathode of 12' by line 20. A rectifier 22 is connected between the cathode of tube 12' and line 24 which extends to the igniting electrode of tube 12', line 24 extending also to an adjustable brush 26 associated with the phase shifting device comprising a commutator 28 and the second adjustable paired brush 30, the latter being connected by line 32 to a timing switch 14, the opposite side of which is connected by line 34 to the igniting electrode of tube 12 and also to a rectifier 36 connected between that line and the cathode of tube 12. A resistor 38 is applied across the incoming line and the output of the control system and directly across the primary 40 of the welding transformer, the secondary 42 of which is connected to the actual welding electrodes 10.

Each of these systems is identical and each is energized when its timing switch 14 is closed and when the circuit to the igniting electrodes is completed by its phase shifting commutator 28 assuming a position whereby energy may pass between brushes 26 and 30, if power is being supplied to lines 2 and 2'. Thus if the operator, either through a manual switch or through a remote control automatic switch, causes the timing switch 14 to be closed, a weld will be produced when line 2' is completed to complete the input circuit.

If we have a series of intermittently operating machines whose cycle of operation requires a certain definite period and it is desired to operate a maximum number of these machines without overlap during a certain predetermined time interval, we may ascertain this maximum number by dividing the total time interval by the amount of time necessary to produce one complete machine cycle. As an example of this, let it be assumed that we have a series of welders making 180 welds or spots per minute. Let us also assume that for each complete spot or weld 20 electrical cycles are necessary. With the further assumption that ordinarily 60 cycle current is being used, it will be obvious that three welds will be completed per second inasmuch as there are 60 cycles per second and one weld utilizes 20 cycles. Therefore we can only operate one machine welding spots at the rate of 180 per minute from a single 60 cycle line as this will entirely fill all of the various periods of that time interval.

However, there are times within a normal weld cycle, assumed to be 20 electrical cycles long, during which current is not flowing. The normal periods of the complete welding cycle are "delay," "weld," "hold," and "off." Of these four periods only during the "weld" period is current passed. Therefore we might operate another machine operating at 180 spots per minute if we cause the same to start at a number of electrical cycles phased from the "on" time of the other machine. Of the 20 electrical cycles necessary for a complete weld cycle or period, in some instances it is only necessary to use a single cycle for passing welding current. Assuming that that is the case, then it would be possible to operate 19 other welding machines on this same circuit, each utilizing a single cycle for welding, and each phased one cycle from the other preceding and following the same. None of these will therefore be energized at the time any other is active from a standpoint of the passage of current which is the main object of this invention, the other times of the welders operation being unimportant from an electrical standpoint. This can best be shown on the chart of Figure 5 where each square on the horizontal axis represents one electrical cycle of current, the numbers on the left vertical line representing different machines. It will be evident from this chart that machine #1 has welding current passing through during the first cycle and that thereafter no current passes therethrough for 19 electrical cycles, this time being occupied in machine #1 by the remaining functions of clamping, holding, etc. However at the 21st electrical cycle, current is again passed for the second weld as shown at 120. This will of course reoccur at every 21st cycle as long as machine #1 is energized. A machine such as #2 may operate on the same performance frequency and utilize the second electrical cycle as shown at 122, and since it operates the same number of times per minute, will also utilize the 22nd cycle as shown at 124 and so on in progression. In the same manner it would therefore be possible to use in all, twenty machines all operating with the same welding frequency per minute, each utilizing one cycle phased from the rest as shown by this chart, and no two ever overlapping or requiring current simultaneously.

In order, however, to assure that when a plurality of welders are thus used that this phase limitation will remain constant, it is necessary to accurately time these operations from a common source. There is shown in Figure 1 a series of cams 44, 46 and 48 on a shaft 50 which are driven by a gear 52 from a gear train involving gears 54, 56, 58, 60, 62 and 64, all of which are driven by a synchronous motor 66. Of these last mentioned, gears 54, 58 and 62 are transfer gears, and gears 56, 60 and 64 drive similar shafts 68, 70 and 72 which also carry a plurality of timing cams 74, 76, 78, 80, 82, 84, 86, 88 and 90 for the various other welding units shown. If therefore these various initial energizing cams are so adjusted as to dephase the units connected to a single line, they will maintain that dephased condition during the normal operation. Actually, of course, it would probably not be practical to utilize each cycle and instead of using the full 20, it would probably be much more satisfactory to use only 10 and to provide one cycle of deenergization between each energization.

Referring briefly to Figure 3, one of the cam switching devices is shown in detail and consists of a shaft 50 upon which is mounted one of the cams such as 44 which may be angularly adjusted around the shaft to different angular positions. This cam has a low section 92 and a raised portion 94 which cooperate with a roller follower 96 mounted on the end of a pivoted bell crank lever 98. A leaf spring 100 biases the bell crank in a clockwise direction as shown in this figure to maintain the roller 96 in contact with the cam surface. The opposite end of the bell crank carries a switch point 102 which cooperates with a stationary switch point 104 insulatedly mounted upon a base through an insulated mounting 106. A second insulating block 108 is also mounted on the base and supports a stationary switch arm 110 in spaced relation with a resilient or movable switch arm 112, the latter having an insulating block 114 projecting outwardly from the end which cooperates with a pin 116 projecting from the surface of the cam 44. The main control switch 102—104 is thus allowed to remain closed through a certain portion of the rotation of this shaft and if the manual switch controlling the particular welding machine controlled by this cam is closed during this portion of rotation, the welder is energized and will go through its normal cycle. If, however, the roller 96 is riding upon the raised cam surface 94, the welder will not be operated until it has again dropped to the lower diameter portion 92 to allow the switch 102—104 to close. In this manner the interlocking system will prevent the welder from being operated during certain predetermined portions.

In order to index the different cams to different angular positions so that no two will overlap, the same may be timed by connecting the switch 110—112 into any conventional indicating circuit and for timing the different switches. If, therefore, each of the welding machines connected to any one line is dephased through the operation of the cam switches controlling the same, they will not operate or allow energization of their welding machines simultaneously and since they are all operating on the same frequency or multiples thereof, will remain in this dephased condition throughout all operation and there will be no tendency to ever reach a point where they will synchronize.

If, for example, a number of machines operating at 180 spots per minute are being fed by energy from a single line and in this instance let us suppose that we are referring to the top four welding machines all connected to line 2, it may be necessary to provide at least a portion of these machines operating at a lower number of spots per minute. It is necessary also to be sure that these machines do not operate at the same instant. In order to maintain the dephased operation of these machines, it is still necessary to operate on multiples of the frequencies of operation. One machine operating at 180 spots per minute may therefore be replaced by two machines operating at 90 spots per minute, or two machines operating at 180 spots per minute may be replaced by five machines operating at 72 spots per minute. This is illustrated in block diagrammatic form in Figure 4 where the four top squares illustrate the four welding machines previously mentioned. These may have substituted therefor any of the combinations shown in the second or third tier of squares or any arithmatical combination of machines which will total the same figures.

This substitution of machines of different frequencies is also shown in Figures 5 and 6. In Figure 5 the first 14 machines are shown on the chart as all operating at the same frequency, namely, 180 spots per minute. The last six machines however are shown as operating at 90 spots per minute, the marks 126 and 128 used to indicate their active periods being of different character. The machine #16, which would be 180 spots per minute, is now replaced by two machines operated at one half the frequency of operation, being energized alternately at the times that one original machine #16 would take in the composite plan. As shown in the chart, two machines could also be substituted for machines 17, 18, 19 and 20.

Figure 6 is an operation chart similar to Figure 5 showing the utilization of machines having a plurality of different frequencies of operation. In this chart the spaces again each represent two electrical cycles so that more recurrent cycles can be illustrated. The first nine machines are shown as operating on a frequency of 180 spots per minute and they occupy cycles 3–11 of the 20 cycle period. The three machines of this chart, namely, 10, 11 and 12, are shown operating at 120 spots per minute and it is obvious that their active periods do not coincide with any others. They take the place of two machines operating at 180 spots per minute. The next series shown as machines 13, 14, 15, 16 and 17 show the use of five machines operating at 72 spots per minute which take the place of two machines operating at 180 spots per minute and the last three machines show the use of 90 spots per minute machines, two of which can be substituted for each machine at 180 spots per minute as shown by the different character of the marks 130 and 132. Therefore by examining the chart of Figure 6 it will be evident that by using multiple or submultiple operation frequencies different speeds of welding may be utilized without interfering with the operation of the composite system; the different machines will not be actuated at the same time. Therefore, with our system a plurality of welding machines may be operated from a single or three-phase line and controlled so that not more than one machine is connected to a line to be supplied with power at a single instant and these may be dephased and operated for a long period of time with the assurance that this situation will not be altered. In this manner the power input to a plant operating a series of machines will only need to be sufficient to operate a single machine.

We claim:

1. In interlocking means, an electrical transmission line, a plurality of units operable at different predetermined set rates and continuously acting dephased switching means connected between each unit and the line whereby no two units will be energized at one time, but the plurality may be operated over a period.

2. In interlocking means, an electrical transmission line, a plurality of units operable at different predetermined set rates and continuously acting dephased switching means connected between each unit and the line and driven from a common source whereby no two units will be energized at one time, but the plurality may be operated over a period.

3. In interlocking means, an electrical transmission line, a plurality of units operable at a predetermined set rate or a multiple or submultiple of that rate, and continuously acting dephased switching means connected between the transmission line and each unit whereby only one unit at a time can be energized from the line, but the plurality may be operated at random or sequentially.

4. In interlocking means, an electric transmission line, a plurality of units operable at different predetermined multiple rates adapted to be energized from the line intermittently, switches controlling the energization thereof connected to the units and to the line, a portion of said switches controlling each unit at a certain fixed periodicity and a plurality of commonly driven phased switches in series with the first-named switches whereby no two of the phased switches may be closed at one time to prevent simultaneous energization of more than one unit.

FRANCIS G. DA ROZA.
FRANK E. HILL.